April 12, 1949.  J. M. MOCHEL  2,467,144
ELECTRICALLY CONDUCTING REFRACTORY BODY
Filed Nov. 22, 1944
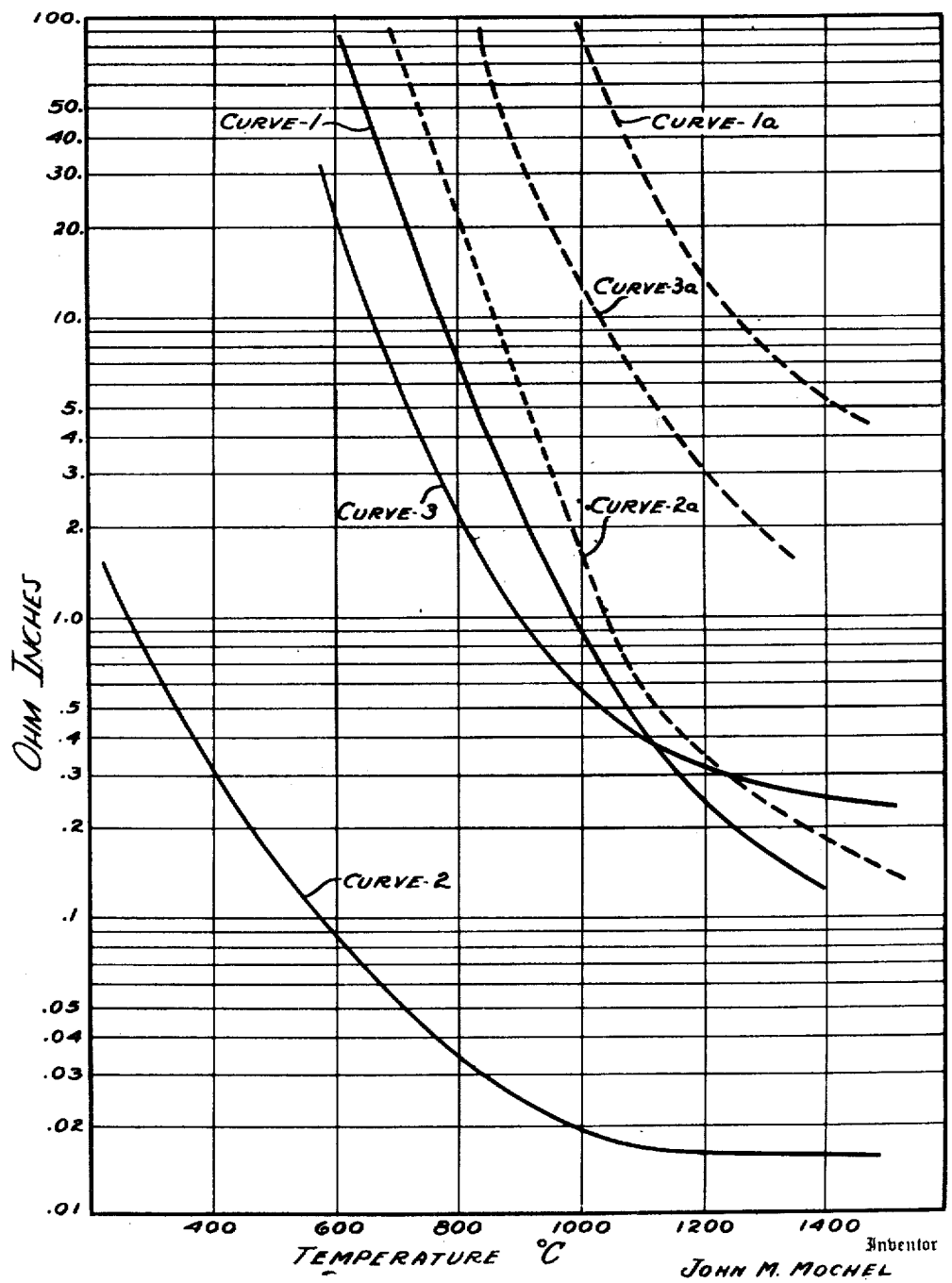
Inventor
JOHN M. MOCHEL
By Knight & Fowler
Attorneys Patented Apr. 12, 1949

2,467,144

UNITED STATES PATENT OFFICE 2,467,144

ELECTRICALLY CONDUCTING REFRACTORY BODY

John M. Mochel, Corning, N. Y., assignor to Corning Glass Works, Corning, N. Y., a corporation of New York Application November 22, 1944, Serial No. 564,689

3 Claims. (Cl. 106—55)

Refractory ceramic compositions which are inert to molten glass and which also will conduct a substantial current of electricity at glass melting temperatures have long been desired. The provision of such conducting refractory compositions would give impetus to the development of electrical glass melting methods and furnaces. Known refractory materials which are electrically conducting, such as graphite, when used in contact with molten glass, have an objectionable tendency for the chemical reduction of the glass constituents and the formation of seeds. Some refractory metals, such as the noble metals, are more or less inert to molten glass but their scarcity and high cost limit their use on anything but a relatively very small scale.

The primary object of this invention is to provide a ceramic refractory composition which is both inert to the corrosive and erosive action of molten glass and a good conductor of electricity at glass melting temperatures.

Another object is to provide ceramic refractory compositions which can be employed as electrodes in the electrical melting of glass.

Still another object is to provide known ceramic refractory bodies with a substantial electrical conductivity.

A further object is to provide a simple method for lowering the electrical resistance of known ceramic refractory bodies.

In Patent 2,244,777 it is shown that tin oxide, when molded and fired, forms refractory bodies which are exceedingly resistant to the corrosive and erosive action of molten glass and that the slow and persistent firing shrinkage of such bodies can be accelerated and accomplished in a single firing operation if the tin oxide contains a small percentage of a shrinking agent comprising a compound of one of the following metals: copper, silver, gold, manganese, iron, cobalt and nickel.

I have now discovered that when they are heated to the neighborhood of 1200° C. or above, such tin oxide bodies have an appreciable electrical conductivity which is greater for the bodies which have been shrunk by the addition of a shrinking agent.

I have further found that when .5% or more of uranium oxide or equivalent uranium compound is introduced into such bodies, preferably in addition to the shrinking agent, their electrical resistance, when heated, is lowered to such an extent that the composition can be employed for electrodes and electrical conductors in direct contact with molten glass.

Oxides and compounds of uranium are the only materials which I have found to be effective for my purpose in lowering the electrical resistance of a body composed of tin oxide. The uranium is preferably introduced as the oxide and the maximum effect is produced with about .5% or more of $UO_2$ or its equivalent. Further additions of uranium beyond .5% $UO_2$ produce no further lowering of the resistance, but do no harm aside from the unnecessary expense. It is believed that the tin oxide forms a solid solution with the uranium oxide and that not more than about .5% $UO_2$ will dissolve.

The effect of the uranium oxide in lowering the electrical resistance of a tin oxide body is greater and the resistance is thereby decreased to a lower value in compostions which contain a shrinking agent capable of bringing about practically complete shrinkage of the body in a single firing. As shown in the prior patent, such shrinking agents comprise compounds of copper, silver, gold, manganese, iron, cobalt and nickel. I have found that zinc compounds also act as shrinking agents in tix oxide bodies if the bodies are fired at temperatures about 100° C. higher than those required for the prior shrinking agents.

The new tin oxide bodies, like those described in the patent, may be molded in known manner either by ramming or pressing a plastic batch in a mold or by forming a slip and casting it in the usual manner. If the shinking agent is to be introduced as a soluble salt, for example $CuCl_2$, it may be advantageous in slip casting to introduce the salt as a solution after the body has been shaped and partially sintered by soaking the porous sintered body in the solution and drying and firing it. I prefer to use about .5% of the shrinking agent, preferably .5% CuO or an equivalent copper compound, which is nearly the minimum effective amount, but amounts somewhat less or greater than this are also effective. Like the shrinking agent, the uranium compound, if insoluble, may be finely pulverized and added directly to the batch, but if in the form of a soluble salt it may be dissolved and introduced into the partially sintered body by impregnation. It is preferable to use oxides or insoluble compounds both for the shrinking agent and uranium additions.

In order to prevent the formation of drying cracks prior to sintering or firing and to minimize firing shrinkage, it is preferable to employ in the batch upwards of 50% or more of a grog which is prepared by prefiring a portion of the batch and grinding it to the desired fineness.

In order to insure a clear understanding of the invention, reference is had to the accompanying drawing which comprises a graph showing a series of curves representing the change in electrical resistance with change in temperature of the compositions which are given in percent by weight in the following table. The numbers designating the curves are the numbers of the respective corresponding compositions. The rate of change in electrical resistance is relatively large and hence the values of the electrical resistance are plotted on a logarithmic scale for the better presentation of the data:

|         | 1 | 1a | 2 | 2a | 3 | 3a |
|---------|---|----|---|----|---|----|
|         | Per cent | Per cent | Per cent | Per cent | Per cent | Per cent |
| $SnO_2$ | 89 | 100 | 96 | 98 | 58.0 | 59.3 |
| $UO_2$  | 2 |    | 2 |    | 1.9 |    |
| CuO     |   |    | 2 | 2 | 1.1 | 1.2 |
| Zircon  |   |    |   |   | 39.0 | 39.5 |

Compositions 1, 2 and 3 are examples of refractory bodies comprising essentially tin oxide and containing uranium oxide in accordance with my invention. Compositions 1a, 2a and 3a, which are shown for comparison, correspond to compositions 1, 2 and 3, respectively, from which the uranium oxide was omitted. Compositions 3 and 3a contain a relatively large amount of zircon which serves to dilute the more expensive tin oxide and also to protect it from loss through reduction and evaporation when heated at high temperatures in gas fired installations.

Referring to the drawing it will be seen that the introduction of uranium oxide into the compositions causes a substantial lowering of the electrical resistance at glass melting temperatures or near 1200° C. and above. Composition 2, which is composed primarily of tin oxide and which contains a shrinking agent and uranium oxide, attained the lowest electrical resistance at these temperatures.

I claim:

1. As a new article of manufacture, a refractory body characterized by a decrease in electrical resistance with an increase in temperature and comprising a sintered mixture consisting of stannic oxide containing .5 to 2% of an oxide selected from the group consisting of the oxides of cobalt, nickel, iron, copper, silver, gold, manganese, and zinc, and .5 to 2% $UO_2$.

2. As a new article of manufacture, a refractory body characterized by a decrease in electrical resistance with an increase in temperature and comprising a sintered mixture consisting of stannic oxide containing .5 to 2% CuO and .5 to 2% $UO_2$.

3. As a new article of manufacture, a refractory body characterized by a decrease in electrical resistance with an increase in temperature and comprising a sintered mixture consisting of approximately 96% stannic oxide, 2% CuO, and 2% $UO_2$.

JOHN M. MOCHEL.

REFERENCES CITED

The following references are of record in the file of this patent:

UNITED STATES PATENTS

| Number | Name | Date |
|--------|------|------|
| 2,017,272 | Meyer | Oct. 8, 1935 |
| 2,244,777 | Hood | June 10, 1941 |
| 2,256,033 | McLachlan | Sept. 16, 1941 |

FOREIGN PATENTS

| Number | Country | Date |
|--------|---------|------|
| 368,270 | Great Britain | Feb. 29, 1932 |
| 368,272 | Great Britain | Feb. 29, 1932 |
| 368,770 | Great Britain | Feb. 29, 1932 |
| 554,607 | Germany | 1932 |